(12) United States Patent
Miller et al.

(10) Patent No.: US 9,112,935 B2
(45) Date of Patent: Aug. 18, 2015

(54) MANIPULATING BINARY LARGE OBJECTS

(71) Applicant: Microsoft Corporation, Redmond, WA (US)

(72) Inventors: Michael Alyn Miller, Redlands, CA (US); Christopher Lane Boedigheimer, Redmond, WA (US); David James Whiteford, Redmond, WA (US); Ashok Chandrasekaran, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 420 days.

(21) Appl. No.: 13/712,988

(22) Filed: Dec. 13, 2012

(65) Prior Publication Data
US 2013/0232190 A1  Sep. 5, 2013

Related U.S. Application Data

(60) Provisional application No. 61/606,740, filed on Mar. 5, 2012.

(51) Int. Cl.
*G06F 15/16* (2006.01)
*H04L 29/06* (2006.01)

(52) U.S. Cl.
CPC ..................... *H04L 67/42* (2013.01)

(58) Field of Classification Search
None
See application file for complete search history.

(56) References Cited

U.S. PATENT DOCUMENTS

| | | | |
|---|---|---|---|
| 6,078,920 A * | 6/2000 | Tan et al. | 1/1 |
| 7,257,592 B2 * | 8/2007 | Dinh et al. | 1/1 |
| 2001/0044339 A1 | 11/2001 | Cordero et al. | |
| 2007/0226505 A1 * | 9/2007 | Brickell | 713/176 |
| 2008/0227548 A1 | 9/2008 | Choudhry et al. | |
| 2008/0268947 A1 | 10/2008 | Fyock et al. | |
| 2009/0077373 A1 * | 3/2009 | Kramer | 713/155 |
| 2010/0063854 A1 | 3/2010 | Purvis et al. | |
| 2010/0106695 A1 * | 4/2010 | Calder et al. | 707/696 |
| 2010/0106734 A1 * | 4/2010 | Calder et al. | 707/758 |
| 2010/0113160 A1 | 5/2010 | Belz et al. | |
| 2011/0119668 A1 | 5/2011 | Calder et al. | |
| 2011/0136577 A1 | 6/2011 | Dietz et al. | |
| 2011/0196831 A1 * | 8/2011 | Zunger et al. | 707/634 |
| 2012/0054197 A1 * | 3/2012 | San Martin et al. | 707/747 |
| 2014/0105402 A1 * | 4/2014 | Taban et al. | 380/278 |

OTHER PUBLICATIONS

"Designing Hosted and Cloud Services", Retrieved at <<http://msdn.microsoft.com/en-us/library/ee658110.aspx>>, Retrieved Date: Mar. 20, 2012, pp. 17.

* cited by examiner

*Primary Examiner* — Brian P Whipple
(74) *Attorney, Agent, or Firm* — Ben Tabor; Kate Drakos; Micky Minhas

(57) ABSTRACT

Embodiments provide automated access policy enforcement, content rule enforcement, and data transformations in a binary large object (blob) storage service. Verified and unverified clients are allowed varying degrees of access to stored blobs. In response to a read request associated with a target blob of a particular blob type, criteria from the read request are used to execute one or more transformation functions defined by the blob type to create transformed data, and the transformed data is provided to the client. In response to a write request including a target blob of a particular blob type, a set of content rules associated with the blob type is executed against the target blob. The target blob is stored based on the content rules being successfully executed.

20 Claims, 5 Drawing Sheets

MANIPULATING BINARY LARGE OBJECTS

CROSS-REFERENCE TO RELATED APPLICATION

This application claims the benefit of U.S. Provisional Application No. 61/606,740, filed Mar. 5, 2012, which is incorporated herein by reference in its entirety.

BACKGROUND

In some existing software systems, when an application such as a game accesses (e.g., reads and/or writes) data using a storage service, the application must supply all business logic related to validating, transforming, and securing that data. Further, existing binary large object (blob) storage systems treat blobs as opaque binary objects and do not enable an application to access individual data elements within a blob.

SUMMARY

Embodiments of the disclosure enable automated data transformations, content rules, and/or access policies in a binary large object (blob) storage service. Blobs may be associated with blob types that define transformation functions. A read request for a blob, or a portion thereof, is received from a client. The read request includes one or more criteria. The blob type associated with the target blob is determined, and, responsive to the received read request, a transformation function defined by the determined blob type is executed based on the criteria to create transformed data. Executing the transformation function includes reducing one or more dimensions of graphical data in the target blob, applying a data reduction algorithm to data in the target blob, applying a format conversion to data in the target blob, and/or filtering data in the target blob. The transformed data is provided to the client.

A blob type may be associated with a set of content rules. A write request containing a target blob associated with the blob type is received from a client. Responsive to the received write request, the set of content rules associated with the defined blob type is executed against the target blob in the write request. Executing the set of content rules includes validating data in the target blob, classifying data in the target blob, and/or applying a format conversion to data in the target blob. The target blob is stored in a memory area based on the set of content rules being successfully executed against the target blob.

Blobs may be stored in a verified data partition or an unverified data partition. A request associated with a target blob is received from a client that is designated as a verified client or an unverified client. An access policy is satisfied unless (a) the client is a verified client, the request is a read request for binary data, and the target blob is stored in an unverified data partition, or (b) the client is an unverified client, the request is a write request, and the target blob is to be stored in a verified data partition. The received request is executed based on the access policy being satisfied.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
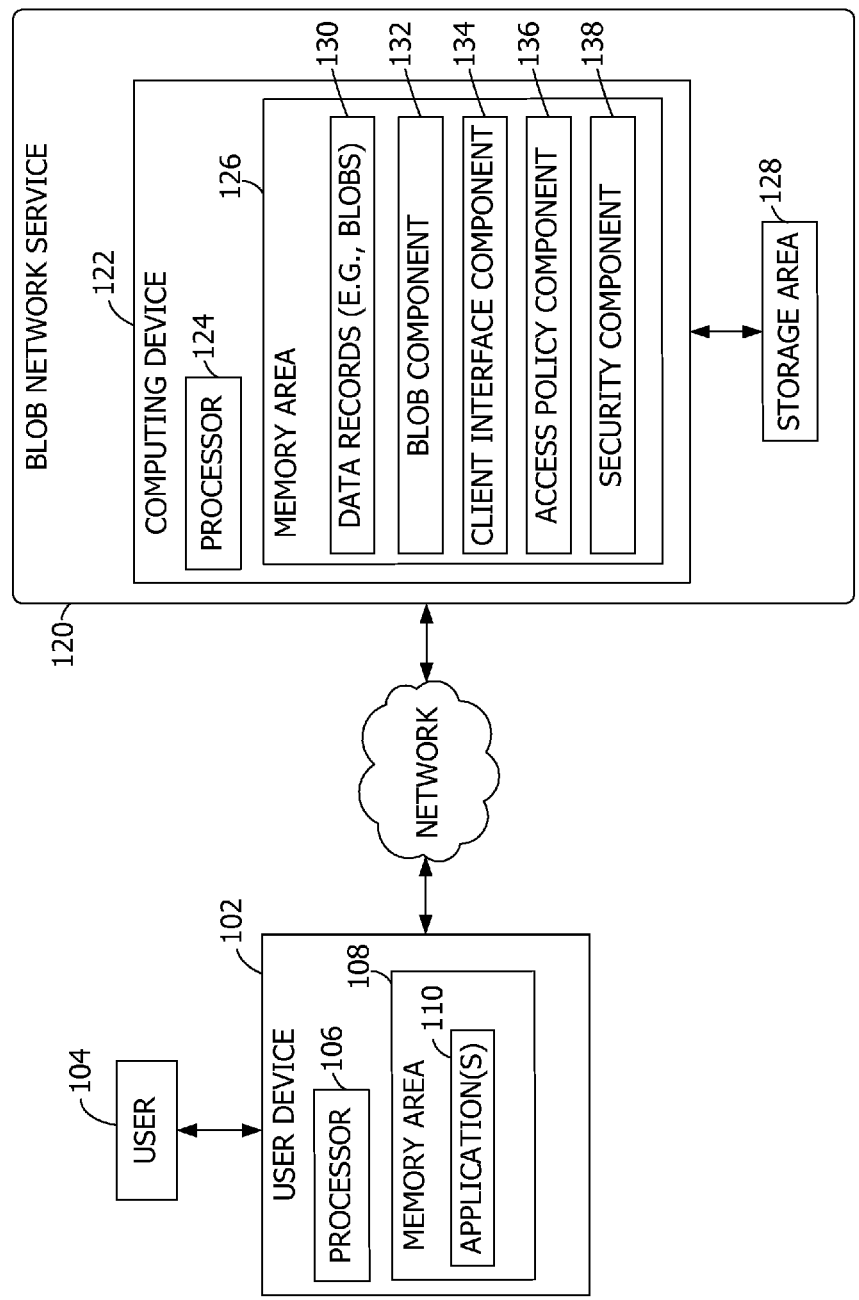
FIG. 1 is an exemplary block diagram illustrating a user device 102 interacting with a blob network service.

Referring to the figures, embodiments of the disclosure enable the manipulation of binary large objects (blobs) using content rules. In some embodiments, a blob network service 120 includes content-related logic encapsulated in a content storage service to enable the abstraction of complex logic from the consumer of the data. The blob network service 120 provides a processing pipeline between a client and the blob-based data (e.g., a blob store), potentially relieving the client of certain content processing tasks, such as format conversion, scaling, etc. The client represents any device, such as a user device 102), that reads and/or writes blobs. Further, the blob network service 120 may provide processing functions that are infeasible to implement in a client. For example, the blob network service 120 may verify data exchanged between different types of devices (e.g., verified and unverified clients) to enable unverified platforms to safely share data with verified platforms. Further, the blob network service 120 may modify blob data in real-time based on criteria (e.g., desired dimensions and/or a desired bit rate) associated with a client.

In some embodiments, the blob network service 120 is manifested as an extensibility framework on top of an existing blob store (e.g., a file system, a blob service, etc.). The blob network service 120 or framework makes it possible to insert filters, validators, and other processes into the read/write pipeline for that blob store. Furthermore, the blob network service 120 provides various extensibility options. For example, an image blob may, in some embodiments, allow the blob store to offer the ability to resize images as the blobs for those images are retrieved from storage. As another example, a video blob may offer transcoding (e.g., converting videos from one format to another or resizing videos to fit smaller screens). Still further, a single-use blob may be destroyed or rendered inaccessible after their contents are retrieved, etc., in some embodiments.

In another example, and as further described below, an application (e.g., a game title) writes key/value data within a single blob, but is then able to read smaller portions of the larger blob. This allows a device that can easily support larger bandwidth consumption to interact with the whole portion of data, while enabling a device with lesser access (e.g., smaller bandwidth) the ability to make smaller reads/writes.

The blob network service 120 further provides simplicity for a user 104. By way of this framework, objects are built that enable publishers or developers to introduce dynamic logic in a file that is seen only as a blob by the user 104. The system also provides a way to isolate or provide permissions on different types of data and/or values. This unlocks potential for enabling scenarios across platforms that have different levels of trustworthiness.

Aspects of the disclosure further determine how data is presented back to the caller. In this way, the blob network service 120 provides the ability to enact specific logic or code paths depending on the type of data that is being requested.

For example, a developer may want to put custom operations or other logic into a specific type of container. When that type of container is requested, the blob network service 120 applies the process defined to that container and returns it to the consumer in a way that the consumer does not know anything about the logic that was used to build the container. In this example, a developer may implement many types of conditionals based on criteria presented and give the file back to the caller where it does not require client changes to support.

An exemplary system provides cross-device, cross-platform, and cross-application access to per-user, per-application group data as well as global application group data. In some embodiments, applications use the blob network service 120 for application-managed saved application state (e.g., in addition to or in lieu of console-managed saved applications such as saved games). The blob network service 120 may be accessed through application group-specific uniform resource locators (URLs), in which case the stored data is accessible to all current and future applications that have permission to access that application group.

While described with reference to games in some embodiments, aspects of the disclosure are operable with any form, type, or quantity of applications.

Referring to FIG. 1, an exemplary block diagram illustrates the user device 102, such as a gaming console, associated with the user 104. The user device 102 represents any device executing instructions (e.g., as application programs, operating system functionality, or both) to implement the operations and functionality associated with the user device 102. The user device 102 may include a mobile computing device or any other portable device. In some embodiments, the mobile computing device includes a gaming console or gaming device, mobile telephone, laptop, tablet, computing pad, netbook, and/or portable media player. The user device 102 may also include less portable devices such as desktop personal computers, kiosks, and tabletop devices. Additionally, the user device 102 may represent a group of processing units or other computing devices. For example, the user device 102 may be another service (e.g., sending requests).

The user device 102 has at least one processor 106 and a memory area 108. The user device 102 may also include at least one user interface. The processor 106 includes any quantity of processing units, and is programmed to execute computer-executable instructions for implementing aspects of the disclosure. The instructions may be performed by the processor 106 or by multiple processors executing within the user device 102, or performed by a processor external to the user device 102. In some embodiments, the processor 106 is programmed to execute instructions such as those illustrated in the figures.

The user device 102 further has one or more computer readable media such as the memory area 108. The memory area 108 includes any quantity of media associated with or accessible by the user device 102. The memory area 108 may be internal to the user device 102 (as shown in FIG. 1), external to the user device 102 (not shown), or both (not shown).

The memory area 108 stores, among other data, one or more applications 110. The applications 110, when executed by the processor 106, operate to perform functionality on the user device 102. Exemplary applications 110 include game titles, mail application programs, web browsers, calendar application programs, address book application programs, messaging programs, media applications, location-based services, search programs, and the like. The applications 110 may communicate with counterpart applications or services such as web services accessible via a network. For example, the applications 110 may represent downloaded client-side applications that correspond to server-side services executing in a cloud.

The user device 102 may include a graphics card for displaying data to the user 104 and receiving data from the user 104, along with computer-executable instructions (e.g., a driver) for operating the graphics card. Further, the user device 102 may include a display (e.g., a touch screen display or natural user interface) and/or computer-executable instructions (e.g., a driver) for operating the display. The user device 102 may also include one or more of the following to provide data to the user 104 or receive data from the user 104: speakers, a sound card, a camera, a microphone, a vibration motor, one or more accelerometers, a BLUETOOTH brand communication module, global positioning system (GPS) hardware, and a photoreceptive light sensor. For example, the user 104 may input commands or manipulate data by moving the user device 102 in a particular way.

In some embodiments, the user device 102 includes a communications interface such as a network interface card and/or computer-executable instructions (e.g., a driver) for operating the network interface card. Communication between the user device 102 and other devices may occur using any protocol or mechanism over any wired or wireless connection. In some embodiments, the communications interface is operable with near-field communication (NFC) tags.

In exemplary embodiments, the user device 102 communicates with the blob network service 120, which provides data storage and retrieval services. The user device 102 and/or an application 110 executed by the user device 102 may be referred to as a client to the blob network service 120.

The blob network service 120 includes one or more computing devices 122. The computing device 122 represents any device executing instructions (e.g., as application programs, operating system functionality, or both) to implement the operations and functionality described herein. Additionally, the computing device 122 may represent a group of processing units or other computing devices The computing device 122 has at least one processor 124 and a memory area 126. The processor 124 includes any quantity of processing units, and is programmed to execute computer-executable instructions for implementing aspects of the disclosure. The instructions may be performed by the processor 124 or by multiple processors executing within the computing device 122, or performed by a processor external to the computing device 122. In some embodiments, the processor 124 is programmed to execute instructions such as those illustrated in the figures (e.g., FIG. 2, FIG. 3, and FIG. 5).

The computing device 122 further has one or more computer-readable media such as the memory area 126. The memory area 126 includes any quantity of media associated with or accessible by the computing device 122. The memory area 126 may be internal to the computing device 122 (as shown in FIG. 1), external to the computing device 122 (shown by storage area 128), or both.

The memory area 126 stores one or more data records 130. While described as "records," the data records 130 represent any data stored in any format, configuration, structure, organization, or type. For example, the data records 130 may include one or more of the following: blob data, blob type data, transformation functions, content rules, access policies, text data, spreadsheet data, images, audio, video, and/or database data. The data records 130 may be stored in the memory area 126 as shown in FIG. 1 and/or stored in the storage area 128 external to the computing device 122. In some embodiments, a data record 130 has one or more fields associated therewith. Each field corresponds to a particular element or item of data.

The memory area 126 further stores one or more computer-executable components. Exemplary components include a blob component 132, a client interface component 134, an access policy component 136, and a security component 138. The components, when executed by the processor 124 cause the processor 124 to enable access to data managed by computing device 122, as described next with reference to the figures.

At least a portion of the functionality of the various elements in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

Figure 2:
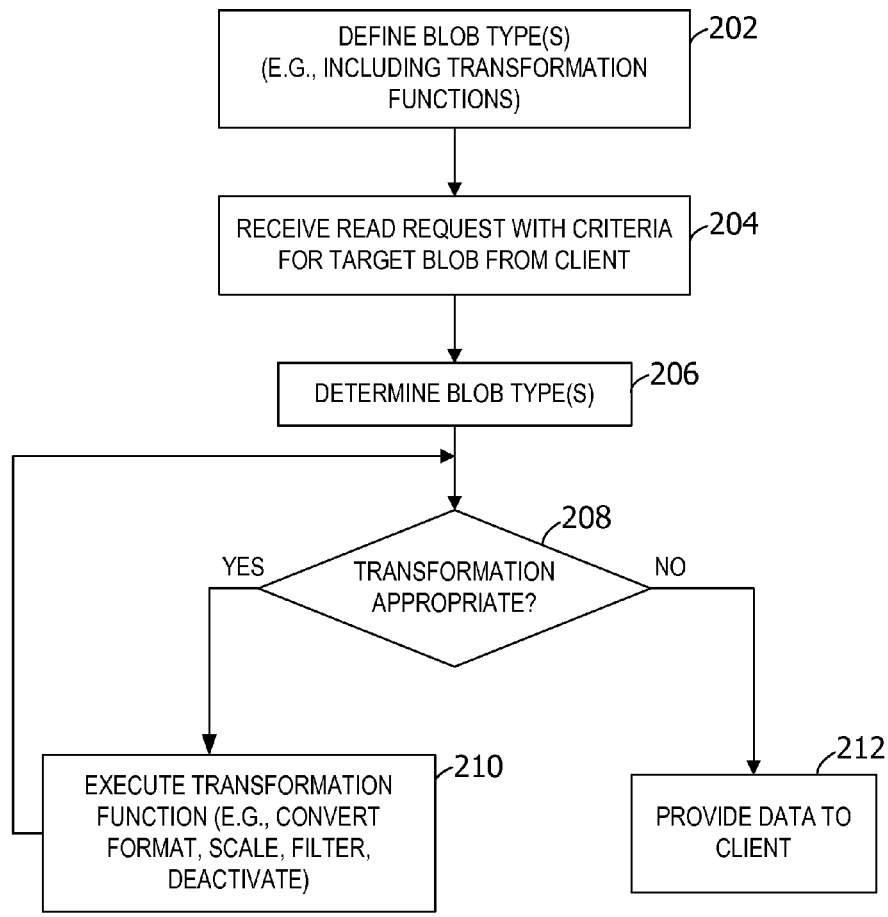
FIG. 2 is an exemplary flow chart illustrating operation of the computing device to execute a read request from a client.

Referring next to FIG. 2, an exemplary flow chart illustrates operation of the computing device 122 to execute a read request from a client, such as the user device 102. While the operations illustrated and/or described with reference to FIG. 2 are described as being performed by the blob network service 120 in some embodiments, the operations may be performed by any entity. For example, one or more of the operations may be performed by an entity remote from both the user device and the memory area 126 (and/or storage area 128).

At 202, one or more blob types are defined. For example, the user 104 may create blob types representing various types of content (e.g., video, images, audio, and/or text). Each blob type defines zero or more transformation functions that may be executed against data stored in a blob of that type. Blob types and blobs associated therewith are stored in the memory area 126.

At 204, the computing device 122 receives, from a client, a read request for a target blob representing at least a portion of one or more of the blobs stored by the memory area 126. The read request includes one or more criteria. For example, the criteria may specify one or more desired bit rates, desired dimensions, desired quality levels (e.g., relative levels such as low, medium, and high), and/or desired data formats.

At 206, responsive to the received read request, the computing device 122 determines the blob type(s) associated with the target blob. At 208, the computing device 122 determines whether one or more transformations are appropriate based on the criteria provided by the client. In some embodiments, a transformation is appropriate when the criteria specify a data attribute (e.g., a desired data format) that is different from a corresponding data attribute associated with the target blob, and a blob type associated with the target blob defines a transformation function capable of creating output data satisfying the specified data attribute based on the target blob. In an example scenario, the client specifies a first video encoding, and video data in the target blob is stored in a second video encoding. If the target blob is associated with a blob type defining a data format conversion (also known as "transcoding") function capable of producing video in the first encoding based on video in the second encoding, the computing device 122 determines that this transformation is appropriate.

At 210, the computing device 122 executes a transformation function determined to be appropriate in the operation at 208. Execution of the transformation function creates transformed data based on the input data (e.g., data in the target blob or the output of a previously executed transformation function). In exemplary embodiments, transformation functions include reducing one or more dimensions of graphical data in the target blob, applying a data reduction algorithm to data in the target blob, applying a format conversion to data in the target blob, and/or filtering data in the target blob. In some embodiments, the computing device 122 determines that a plurality of transformation functions are appropriate (e.g., scaling and converting the format of an image) and performs the operation at 210 to execute each appropriate transformation function. At 212, when any appropriate data transformation functions have been executed, the computing device 122 provides either the transformed data or the target blob to the client.

In some embodiments, executing a transformation function based on the criteria provided by the client enables improved computing performance at the client. In an example scenario, the request includes criteria specifying desired graphical data dimensions corresponding to a display resolution of the user device 102. The target blob includes graphical data (e.g., image or video data) with dimensions larger than the desired dimensions, and the computing device 122 executes a transformation function by scaling the graphical data to create transformed graphical data having dimensions smaller than the dimensions of the graphical data stored in the target blob. The transformed data is smaller in size than the original data and can be transmitted to the client relatively quickly. In addition, scaling at the client may be reduced or avoided, improving rendering speed.

In some embodiments, transforming data in the target blob includes filtering data in the target blob based on criteria such as an indication of which data elements are desired by client, one or more access privileges associated with the client, and/or one or more access control lists associated with the target blob. Further, in some embodiments, a limited-use blob type is provided. In an example scenario, a blob type defines a deactivation transformation function that limits the accessibility of a blob by a quantity of accesses (e.g., one or more) and/or by a period of time. When a read request for a blob associated with a limited-use blob type is received, the computing device 122 executes the deactivation transformation function, which deactivates the target blob if the quantity and/or time limit have been reached. Once deactivated, the target blob is subsequently inaccessible to the client.

Figure 3:
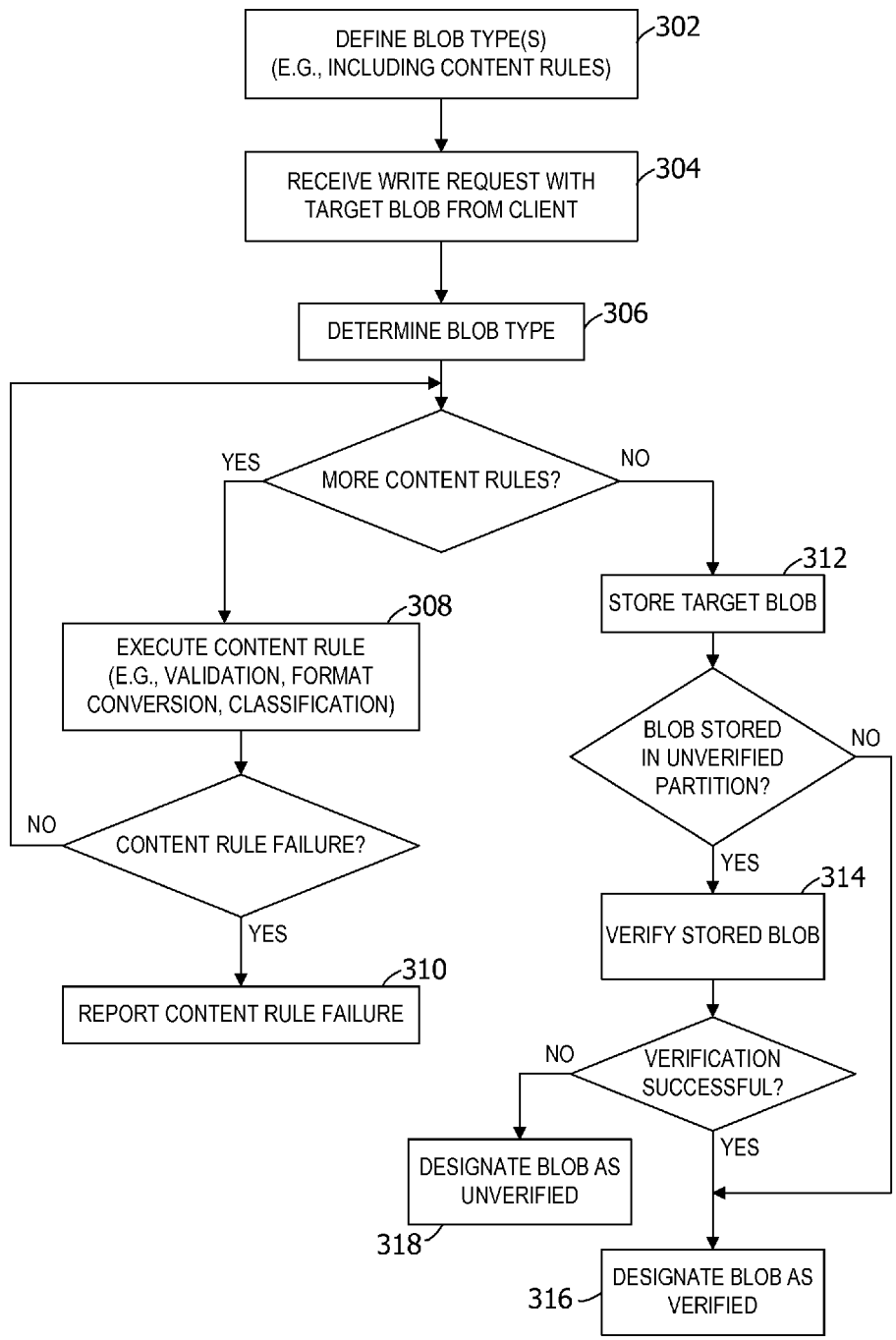
FIG. 3 is an exemplary flow chart illustrating operation of the computing device to execute a write request from a client.

Referring next to FIG. 3, an exemplary flow chart illustrates operation of the computing device 122 to execute a write request from a client. While the operations illustrated and/or described with reference to FIG. 3 are described as being performed by the blob network service 120 in some embodiments, the operations may be performed by any entity. For example, one or more of the operations may be performed by an entity remote from both the user device 104 and the memory area 126 (and/or storage area 128).

At 302, one or more blob types are defined. Each blob type is associated with a set of zero or more content rules to be executed against input data prior to storing the input data in a blob of that type. For example, a content rule may specify a particular data format or a particular type of data validation. Blob types and blobs associated therewith are stored in the memory area 126.

At 304, the computing device 122 receives, from a client, a write request containing a target blob associated with a defined blob type. At 306, responsive to the received write request, the computing device 122 determines the blob type associated with the target blob.

At 308, the computing device 122 executes each content rule in the set of content rules associated with the determined blob type against the target blob. Executing a content rule includes, for example, validating data in the target blob, classifying data in the target blob, and/or applying a format conversion to data in the target blob.

In an example scenario, a content rule specifies a data format (e.g., a video encoding). If the data in the target blob is in a data format other than the specified data format, and a format conversion between the two data formats is available, the computing device 122 executes the format conversion to create data in the specified data format. In some embodiments, a predetermined default data format is associated with a blob type, and a content rule associated with the blob type specifies the default data format for all data stored in blobs of that blob type. For example, a content rule may specify a predetermined default encoding for video data stored in the blob network service 120. The computing device 122 executes this content rule with respect to a target blob including video data in a different encoding by creating video data encoded in the default encoding based on the video data from the target blob.

In some embodiments, a content rule specifies a data validation to be performed on the target blob prior to storing the target blob. Such embodiments may provide a level of assurance that data subsequently read from a blob conforms to an expected structure, is free of malicious software, etc. In an example scenario, the computing device 122 validates data in the target blob based on a set of legal characters, an expected data structure, and/or the presence of executable instructions in the target blob. In these examples, the validation fails if the target blob includes a character other than those in the set of legal characters, if the target blob does not match the expected data structure, or if the target blob includes executable instructions, respectively.

In some embodiments, the computing device 122 executes a content rule at least in part by validating data in the target blob based on a quantity of data in the target blob and a quantity of available storage in the memory area 126 and/or storage area 128. The quantity of available storage may be computed as all unallocated storage, or may be computed based on one or more size-based and/or rate-based storage quotas. For example, the quantity of data stored and/or the frequency of access requests may be limited per user 104, per application or game title, and/or per application or game title group, as described next with reference to FIG. 4.

Figure 4:
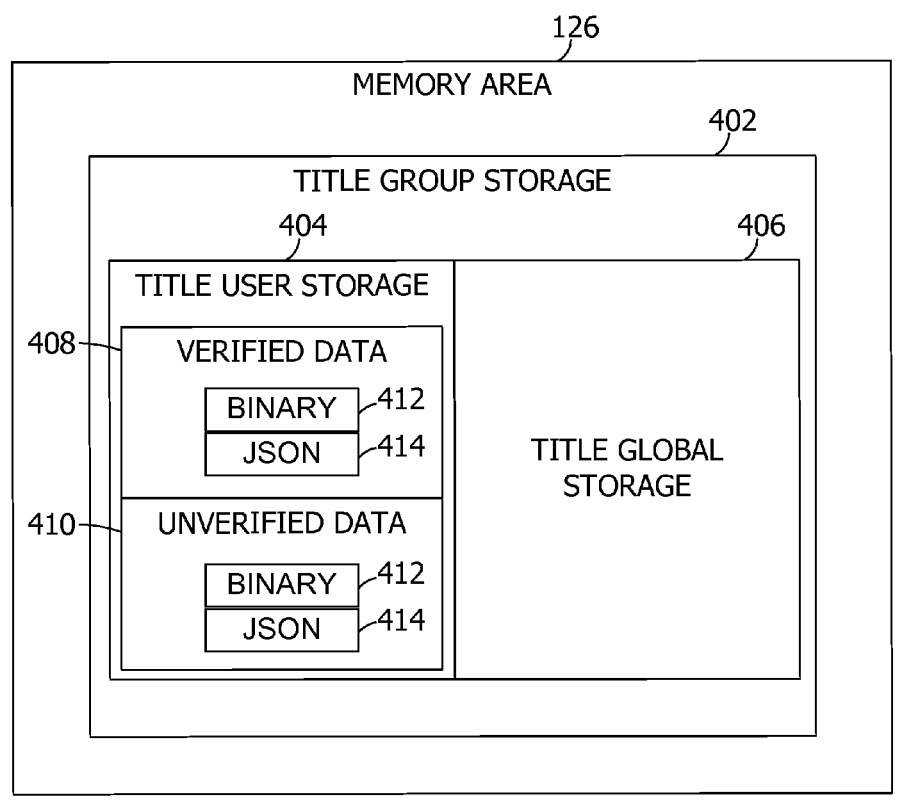
FIG. 4 is an exemplary block diagram illustrating storage of data in the memory area.

Referring next to FIG. 4, an exemplary diagram illustrates partitioned storage of data in the memory area 126. In addition, or alternatively, the storage techniques described may be applied to storage of data in the storage area 128.

The memory area 126 includes a Title Group storage 402, which is a portion of the memory area 126 that is associated with a group of one or more game titles. The memory area 126 may include any quantity of Title Group storages 402, each of which is associated with a Title Group identifier (ID) unique among other Title Group storages 402. When accessing data using the blob network service 120, a game title submits to the computing device 122 an access request specifying a Title Group ID, and the computing device 122 reads from, or writes to, the Title Group storage 402 associated with the specified Title Group ID.

The Title Group storage 402 includes a Title User storage 404 and a Title Global storage 406. A game title stores data that is relevant to all users 104 of the game title and/or Title Group in the Title Global storage 406, and stores data that is relevant to each individual user 104 of the game title and/or Title Group in the Title User storage 404.

In some embodiments, one or more quotas are associated with the Title Group store 402, the Title User storage 404, the Title Global storage 406, and/or some portion thereof. An exemplary set of quota definitions is illustrated in Table 1 below.

TABLE 1

Exemplary Set of Quota Definitions.

| Limit (Quota) | Value |
| --- | --- |
| Title Global Limit | 150 megabytes (MB) per Title Group per title |
| Title User Data Limit | 250 MB per Title Group per user |
| Max Individual Binary File (global) | 150 MB |
| Max Individual Binary File (user) | 250 MB |
| Max Individual JSON File | 4 MB |
| Max Individual CONFIG File | 1 MB |
| Max Number of Files (global/user) | 5000 |
| Read Requests (avg. per 1 hour/session) | 1 request per minute (per Title Group per user) |
| Write Requests (avg. per 1 hour/session) | 1 request per minute (per Title Group per user) |

Using the quotas shown in Table 1 as an example, when the computing device 122 receives a write request associated with a particular Title Group and user 104, the computing device 122 identifies the Title User storage 404 corresponding to that Title Group and user 104. The computing device 122 validates the target blob included in the write request by determining whether the size of the target blob is less than or equal to the available storage within the identified Title User storage 404, where the available storage is calculated as 250 megabytes (MB) (the Title User Data Limit size-based quota in Table 1) minus the currently allocated storage within the identified Title User storage 404. If so, the validation based on the Title User Data Limit size-based quota is successful. Otherwise, the validation is unsuccessful.

As another example, the computing device 122 may validate the target blob in part by calculating the current write request rate (e.g., an average request rate over the previous hour and/or within the current session) associated with the Title Group and user 104, and determining whether the current write request rate is less than or equal to one request per minute (the Write Request rate-based quota in Table 1). If so, the validation based on the Write Request rate-based quota is successful. Otherwise, the validation is unsuccessful.

Referring again to FIG. 3, in some embodiments, executing a content rule includes classifying data in the target blob. Classification may be applied to identify the subject and/or meaning of textual data, the appropriateness of graphical data (e.g., image data and/or video data) for one or more audiences, the presence of copyright-protected data, and/or any characteristics relevant to operation of the blob network service 120. A classification content rule may fail based on the classification associated with a target blob. For example, a target blob containing graphical data may be classified by a classification content rule as inappropriate content, in which case the classification content rule fails. In addition, or alternatively, such classifications may be associated with the target blob and subsequently used for reviewing, filtering, and/or categorizing blobs.

In some scenarios, executing a content rule at 308 fails, indicating that the content rule is not satisfied by the target blob in the write request. For example, the computing device 122 may be unable to convert data in the target blob to a data format specified by a content rule, or data validation may fail due to illegal characters, executable code, etc. At 310, when a content rule is not satisfied, the computing device 122 reports a content rule failure, and the target blob is not stored. The content rule failure may be reported, for example, by denying the write request (e.g., transmitting the failure to the client), by logging the failure, and/or by notifying an administrator of the blob network service 120 of the failure.

If no failures occur, at 312, the computing device 122 stores the target blob in the memory area 126 based on the set of content rules being successfully executed against the target blob. In some embodiments, the Title User storage 404 is divided into two or more partitions, such as a verified (e.g., trusted) data partition 408 and an unverified (e.g., untrusted) data partition 410. Within a write request, a client may specify a location (e.g., a path) within Title Group storage 402 to which a target blob is to be written; this location may include a reference to the verified data partition 408 and/or the unverified data partition 410. As described below with reference to FIG. 5, the computing device 122 may enforce an access policy governing which portions of the Title User storage 404 a client is allowed to access, and the target blob is stored based on determining that the access policy is satisfied.

Generally, at least some data (e.g., binary data) within the unverified data partition 410 is not normally or typically accessible by verified clients, protecting the verified clients from being compromised by malicious data written by unverified clients. In some embodiments, the computing device 122 allows a blob initially stored in the unverified data partition 410 to be accessed as verified data. If the target blob is stored in the unverified data partition 410, at 314, the computing device 122 verifies the data within the target blob. As an example, the computing device 122 may verify the data by determining whether the target blob includes any potentially malicious data, such as executable instructions, values that are outside expected value ranges, and/or characters that are outside a set of expected characters. There may be a check done, for example, on data written into each location based on the blob type. If the verification is successful, the target blob is considered free of malicious data, and at 316, the computing device 122 designates the blob as verified. If the verification is unsuccessful, at 318, the computing device 122 designates the blob as unverified. By validating that the data meets the criteria of the target location, aspects of the disclosure provide a conduit for sharing information between verified and unverified platforms without compromising the security of verified platforms.

Figure 5:
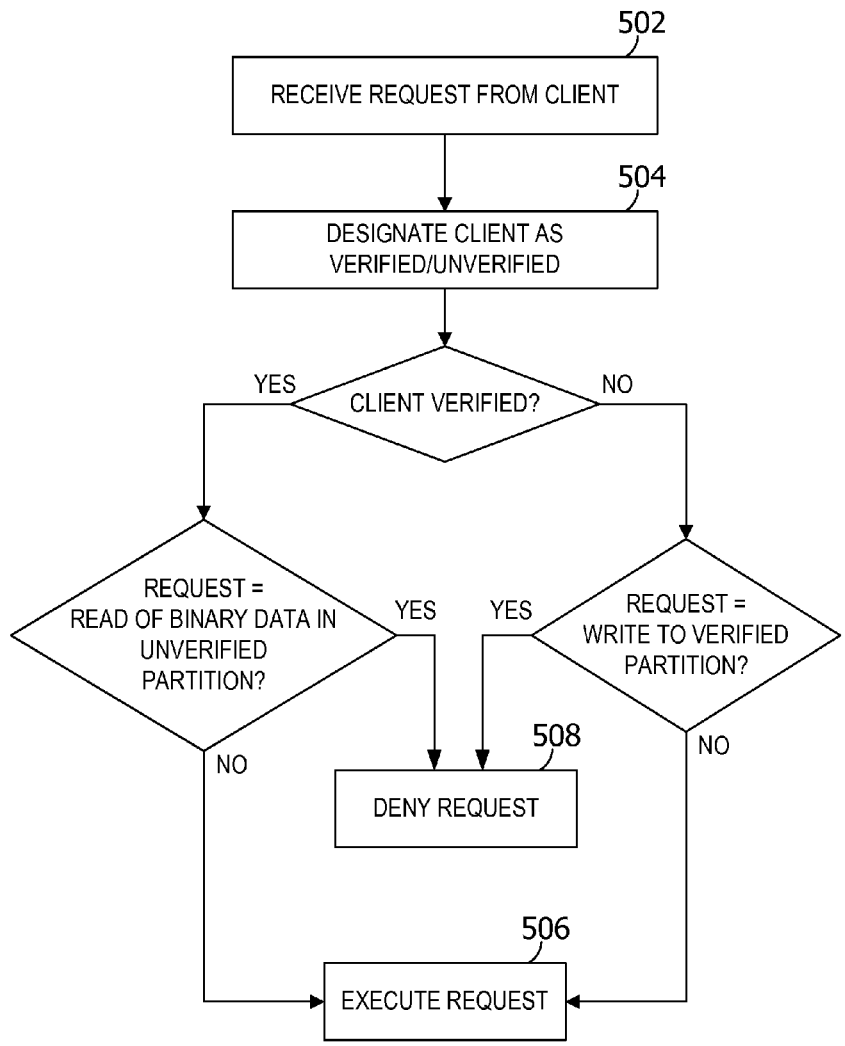
FIG. 5 is an exemplary flow chart illustrating operation of the computing device to apply an access policy to a client request.

Referring next to FIG. 5, an exemplary flow chart illustrates operation of the computing device 122 to apply an access policy to a client request. While the operations illustrated and/or described with reference to FIG. 5 are described as being performed by the blob network service 120 in some embodiments, the operations may be performed by any entity. For example, one or more of the operations may be performed by an entity remote from both the user device and the memory area 126 (and/or storage area 128).

At 502, the computing device 122 receives an access request (e.g., a write request or a read request) associated with a target blob from a client. At 504, the computing device 122 designates the client as either a verified client or an unverified client. For example, the computing device 122 may identify a client account associated with the client and read from the client account a designation of whether the client is verified or unverified. In some embodiments, the client provides one or more security credentials (e.g., within the access request or when establishing a communication session with the computing device 122). Security credentials may include, for example, a client identifier, an electronic signature, a cryptographic key, and/or any other data suitable for identifying the client. The computing device 122 designates the client as verified or unverified based on the security credentials.

The computing device 122 determines whether the access policy is satisfied based on the access request and the designation of the client. If the access policy is satisfied, at 506, the computing device 122 executes the request based on the satisfied access policy. For example, the computing device 122 may execute a read request as described above with reference to FIG. 2 or execute a write request as described above with reference to FIG. 3. If the access policy is not satisfied, at 508, the computing device 122 denies the request. For example, the computing device 122 may deny the request at least in part by transmitting an access policy failure notification to the client.

Referring again to FIG. 4, in exemplary embodiments, the verified data partition 408 and the unverified data partition 410 include binary data 412 and JAVASCRIPT Object Notation (JSON) data 414. In addition, or alternatively, the partitions may include other non-binary data (not shown), such as textual data, extensible markup language (XML) data, configuration data, and/or any other non-binary data suitable for use with the system described. The access policy is satisfied, in some embodiments, unless either a) the client is verified, the request is a read request for binary data 412, and the target blob is stored in the unverified data partition 410, or b) the client is unverified, the request is a write request, and the target blob is to be stored in the verified data partition 408.

Additional Exemplary Implementations

Exemplary blobs processed by the blob network service 120 include, but are not limited to, Binary Blobs, JSON Blobs, or Configuration Blobs. Binary Blobs, for example, store data of any type (e.g., binary, text, XML, etc.), provide basic read/write semantics, support the hypertext transfer protocol (HTTP) Range header to allow partial/blocked reads from large blobs, and support multi-block uploads for large files (e.g., larger than 4 MB in size). The blob network service 120 treats Binary Blobs as opaque data, but applications are free to store any type of data in these blobs.

JSON Blobs, as another example, store JSON objects, enforce the JSON grammar on blobs uploaded to the service, enforce maximum key/value lengths, maximum array size, maximum number of object properties, etc., and provide partial read support by allowing callers to request that a specific sub-hierarchy of the larger JSON object be returned. JSON Blobs provide a way to safely share data between unverified and verified platforms. The blob network service 120 verifies that uploaded JSON blobs adhere to the following exemplary rules and restrictions:

1. The blob content contains valid JSON according to the JSON specification.
2. Keys are limited to 64 bytes.
3. String values are limited to 1024 bytes.
4. Maximum object depth is 16.
5. Maximum array size is 1024.
6. Maximum number of keys in an object is 1024.

JSON Blobs also support a partial-download feature. This is used to retrieve a small part of a larger JSON object and may be used, for example, by bandwidth-constrained platforms such as mobile devices. Similar functionality is available for uploading or modifying smaller pieces of a large JSON Blob.

Callers can select the sub-node for return by using the "select" or "return" query parameter. An exemplary URL is shown below. This URL returns the contents of the "quests" object inside of the fourth entry in the "levels" array.
GET/users/xuid(1234)/storage/titlestorage/titlegroups/5678/data/save1.dat.json?select=levels[3].quests Configuration Blobs, as another example, are read-only (e.g., for game titles) JSON objects, writeable only by the publisher, and have special keys in the JSON object that allow the blob network service 120 to return different JSON values based on information about the incoming call (e.g., randomized based on user 104 or request, locale, title id, etc.). Configuration Blobs are stored in a global data store and are limited to 64 kilobytes (kb) in size in some embodiments.

The blob network service 120 allows data to be shared across gaming applications and platforms by way of Title Group-specific data. Title Group-specific data is accessed using uniform resource identifiers (URIs) containing a Title Group ID. Title Group-specific data can be shared across any number of titles and platforms in some embodiments, as long as those titles have been given permissions to access the data in the Title Group Access Control List (ACL) configuration.

The Title Group Client library is responsible for parsing and interpreting the ACL. The blob network service 120 supplies the logic related to the claims and permissions. The client library, for example, is the component that applies the implicit "deny all" rule at the end of the ACL.

In some embodiments, the blob network service 120 enforces a size-based quota on the data store. The quotas vary based on the type of data (e.g., per-user or global) being accessed and are specified in the title group configuration.

Each memory area 126 or storage area 128 is configured with a settings document unique to that store (e.g., unique among other stores). In some embodiments, the settings document is composed of two elements: ACL (e.g., read/write permissions applied to prefixed sets of URLs on a per-title basis) and quota configuration (e.g., maximum amount of data that can be stored in per-user and global stores). The Title Group System maintains the setting document for Title Group-based stores.

Exemplary application programming interfaces (APIs) supported in some embodiments are shown in Appendix A.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like. Such systems or devices may accept input from the user in any way, including from input devices such as a keyboard or pointing device, via gesture input, and/or via voice input.

In some embodiments, the processors 106, 124 represent an implementation of analog techniques to perform the operations described herein. For example, the operations may be performed by an analog computing device and/or a digital computing device.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments have been described with reference to data monitored and/or collected from users 104. In some embodiments, notice may be provided to the users 104 of the collection of the data (e.g., via a dialog box or preference setting) and users 104 are given the opportunity to give or deny consent for the monitoring and/or collection. The consent may take the form of opt-in consent or opt-out consent.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

The following application programming interfaces (APIs) are supported in some embodiments.

List—Enumerates the blobs under the given path. If no path is given, a listing of all of the blobs in the data area is returned.

Methods associated with List: GET. Exemplary parameters are shown in Table 2 below.

TABLE 2

Exemplary Parameters for List.

| Data Type | URI |
| --- | --- |
| Per-User, Per-Title Group | /users/xuid({xuid})/storage/titlestorage/titlegroups/{titleGroupId}/data/{path} |
| Global Title Group | /media/titlegroups/{titleGroupId}/storage/data/{path} |

Download/Upload/Delete—Downloads, uploads, or deletes data at the given location, depending on the HTTP method.

Methods associated with Download/Upload/Delete: GET, PUT, DELETE. Exemplary parameters are shown in Table 3 below.

TABLE 3

Exemplary Parameters for Download/Upload/Delete.

| Data Type | URI |
| --- | --- |
| Per-User, Per-Title Group | /users/xuid(xuid)/storage/titlestorage /titlegroups/{titleGroupId}/data/{pathFileNameAndType} |
| Global Title Group | /media/titlegroups/{titleGroupId}/storage/data/{pathFileNameAndType} |

GetProperties—Gets the properties for the data type, such as the quota.

Methods associated with GetProperties: GET. Exemplary parameters are shown in Table 4 below.

TABLE 4

Exemplary Parameters for GetProperties.

| Data Type | URI |
| --- | --- |
| Per-User, Per-Title Group | /users/xuid(xuid)/storage/titlestorage /titlegroups/{titleGroupId} |
| Global Title Group | /media/titlegroups/{titleGroupId}/storage |

What is claimed is:

1. A system for manipulating binary objects, said system comprising:
 a memory area storing a plurality of blobs, each of the plurality of blobs being associated with a blob type from a plurality of blob types, each of the plurality of blob types defining one or more transformation functions; and
 a processor programmed to:
  receive, from a client, a read request for a target blob representing at least a portion of one or more of the plurality of blobs stored in the memory area, the read request including one or more criteria;
  determine a blob type associated with the target blob;
  responsive to the received read request, execute a transformation function defined by the determined blob type based on the criteria to create transformed data, wherein executing the transformation function comprises one or more of the following: reducing one or more dimensions of graphical data in the target blob, applying a data reduction algorithm to data in the target blob, applying a format conversion to data in the target blob, and filtering data in the target blob; and
  provide the transformed data to the client.

2. The system of claim 1, wherein the processor is programmed to execute a transformation function based on the criteria by executing a transformation function based on one or more of the following: a desired bit rate, a desired dimension, and a desired quality level.

3. The system of claim 1, wherein the target blob includes video data having first dimensions, and the processor is programmed to execute a transformation function at least in part by scaling the video data to create transformed video data having second dimensions smaller than the first dimensions.

4. The system of claim 1, wherein the target blob includes data in a first data format, and the processor is programmed to execute a transformation function at least in part by applying a format conversion to convert the data in the target blob to a second data format specified by the criteria in the read request.

5. The system of claim 1, wherein the processor is programmed to execute a transformation function at least in part by deactivating the target blob, wherein the deactivated target blob is subsequently inaccessible to the client.

6. The system of claim 1, wherein the client is associated with one or more access privileges, and the processor is programmed to execute a transformation function at least in part by filtering data in the target blob based on the access privileges associated with the client.

7. The system of claim 6, wherein the processor is programmed to filter the data in the target blob based further on one or more access control lists associated with the target blob.

8. A method comprising:
 defining a binary large object (blob) type, wherein defining the blob type includes defining a set of content rules associated with the blob type;
 receiving, from a client, a write request containing a target blob associated with the defined blob type;
 responsive to the received write request, executing the set of content rules associated with the defined blob type against the target blob in the write request, wherein executing the set of content rules comprises one or more of the following: validating data in the target blob, classifying data in the target blob, and applying a format conversion to data in the target blob; and
 storing the target blob in a memory area based on the set of content rules being successfully executed against the target blob.

9. The method of claim 8, wherein the target blob includes video data encoded in a first format, and executing the set of content rules comprises applying a format conversion to the video data to create video data encoded in a second format.

10. The method of claim 9, wherein creating video data encoded in a second format comprises creating video data in a predetermined default format.

11. The method of claim 8, wherein executing the set of content rules comprises validating data in the target blob based on one or more of the following: a set of legal characters, an expected data structure, and the presence of executable instructions in the target blob.

12. The method of claim 8, wherein executing the set of content rules comprises validating data in the target blob based on one or more of the following: a size-based storage quota and a rate-based storage quota.

13. The method of claim 8, wherein the target blob includes graphical data, and executing the set of content rules comprises classifying the graphical data.

14. The method of claim 8, wherein the memory area includes a verified data partition and an unverified data partition, and the target blob is stored in the memory area based further on determining that an access policy is satisfied, wherein the access policy is satisfied when one of the following is true: the client is a verified client, and the client is an unverified client and the target blob is associated with the unverified data partition.

15. One or more computer storage media embodying computer-executable components, said components comprising:
   a binary large object (blob) component that when executed causes at least one processor to store a plurality of blobs, each blob being stored in a verified data partition or in an unverified data partition;
   a client interface component that when executed causes at least one processor to receive, from a client, a request associated with a target blob, the client being designated as a verified client or an unverified client; and
   an access policy component that when executed causes at least one processor to determine whether an access policy is satisfied, wherein the access policy is satisfied unless one of the following is true:
      the client is a verified client, the request is a read request for binary data, and the target blob is stored in an unverified data partition, and
      the client is an unverified client, the request is a write request, and the target blob is to be stored in a verified data partition,
   wherein the blob component causes at least one processor to execute the received request based on the access policy being satisfied.

16. The computer storage media of claim 15, wherein the components further comprise a security component that when executed causes at least one processor to designate the client, based on one or more security credentials provided by the client, as either a verified client or an unverified client.

17. The computer storage media of claim 15, wherein the request is a read request including one or more criteria, and the blob component causes the at least one processor to execute the received request at least in part by:
   responsive to the received read request, executing a transformation function defined by the criteria to create transformed data, wherein executing the transformation function comprises one or more of the following: reducing one or more dimensions of graphical data in the target blob, applying a data reduction algorithm to data in the target blob, applying a format conversion to data in the target blob, and filtering data in the target blob; and
   providing the transformed data to the client.

18. The computer storage media of claim 17, wherein the target blob includes video data having first dimensions, and the blob component causes the at least one processor to execute a transformation function at least in part by scaling the video data to create transformed video data having second dimensions smaller than the first dimensions.

19. The computer storage media of claim 15, wherein the request is a write request, and the target blob is associated with a blob type, the blob type being associated with a set of content rules, wherein the blob component causes the at least one processor to execute the received request at least in part by:
   responsive to the received write request, executing the set of content rules associated with the blob type against the target blob, wherein executing the set of content rules comprises one or more of the following: validating data in the target blob, classifying data in the target blob, and applying a format conversion to data in the target blob; and
   storing the target blob in a memory area based on the set of content rules being successfully executed against the target blob.

20. The computer storage media of claim 19, wherein the target blob includes video data encoded in a first format, and the blob component causes the at least one processor to execute the set of content rules at least in part by applying a format conversion to the video data to create video data encoded in a second format.

* * * * *